(12) United States Patent
Zachary et al.

(10) Patent No.: US 7,107,822 B2
(45) Date of Patent: Sep. 19, 2006

(54) APPARATUS AND METHOD FOR ON-LINE DETECTION OF LEAKY VALVE SEALS AND DEFECTIVE FLOW DIVERTERS

(75) Inventors: Bryan A. Zachary, Alvin, TX (US); Angela E. Summers, Houston, TX (US)

(73) Assignee: Sis-Tech Applications, L.P., Houston, TX (US)

( * ) Notice: Subject to any disclaimer, the term of this patent is extended or adjusted under 35 U.S.C. 154(b) by 0 days.

(21) Appl. No.: 10/949,646

(22) Filed: Sep. 24, 2004

(65) Prior Publication Data

US 2005/0066709 A1    Mar. 31, 2005

Related U.S. Application Data

(60) Continuation-in-part of application No. 10/359,863, filed on Feb. 10, 2003, now Pat. No. 6,820,465, which is a division of application No. 09/811,735, filed on Mar. 19, 2001, now Pat. No. 6,550,314.

(51) Int. Cl.
    *G01M 3/28* (2006.01)
(52) U.S. Cl. .................. 73/46; 73/40; 137/312; 137/557
(58) Field of Classification Search ............ 73/40, 73/46; 137/312, 557
    See application file for complete search history.

(56) References Cited

U.S. PATENT DOCUMENTS

| | | | |
|---|---|---|---|
| 3,398,761 A | 8/1968 | Grove et al. | |
| 4,043,355 A | 8/1977 | Cerruti et al. | |
| 4,573,344 A | 3/1986 | Ezekoye | |
| 4,901,751 A | 2/1990 | Story et al. | |
| 4,916,938 A | 4/1990 | Aikin et al. | |
| 5,533,549 A * | 7/1996 | Sherman ................... 137/557 |
| 5,616,829 A | 4/1997 | Balaschak et al. | |
| 6,128,946 A | 10/2000 | Leon et al. | |
| 6,134,949 A * | 10/2000 | Leon et al. ............ 73/40.5 A |
| 2003/0041651 A1 * | 3/2003 | Krieger et al. ........... 73/46 |

FOREIGN PATENT DOCUMENTS

| | | |
|---|---|---|
| DE | 1801831 A1 | 7/1969 |
| EP | 0267798 A | 5/1988 |
| EP | 0580524 A | 1/1994 |
| GB | 1219726 A | 1/1971 |

* cited by examiner

*Primary Examiner*—Daniel S. Larkin
(74) *Attorney, Agent, or Firm*—Raymond R. Ferrera; Arnold & Ferrera, L.L.P.

(57) ABSTRACT

Disclosed herein is an apparatus for on-line detection of leaky valve seals wherein the apparatus includes an isolation valve having at least one upstream seal, at least one downstream seal, a fluid flow diverter; an inner cavity isolated from a fluid flow path by the seals; a vent port disposed in fluid communication with the inner cavity; a vent valve disposed in fluid communication with the vent port; and a differential pressure sensor disposed in fluid communication with both the vent port and the fluid flow path. Also disclosed is a method of on-line detection of leaky valve seals wherein the method includes disposing at least one upstream seal, at least one downstream seal, a fluid flow path, and a fluid flow diverter in mutual fluid communication; isolating an inner cavity from the fluid flow path by means of the seals; disposing a vent port in fluid communication with the inner cavity; disposing a vent valve in fluid communication with the vent port; and disposing a differential pressure sensor in fluid communication with both the vent port and the fluid flow path. The method can also be used to detect the presence of a defective fluid flow diverter while an associated fluid transport system remains on-line.

31 Claims, 4 Drawing Sheets

APPARATUS AND METHOD FOR ON-LINE DETECTION OF LEAKY VALVE SEALS AND DEFECTIVE FLOW DIVERTERS

CROSS-REFERENCE TO RELATED APPLICATIONS

The present application is a continuation-in-part of prior application Ser. No. 10/359,863 filed Feb. 10, 2003 now U.S. Pat. No. 6,820,465, which is a divisional of prior application Ser. No. 09/811,735 filed Mar. 19, 2001, now issued as U.S. Pat. No. 6,550,314.

BACKGROUND

1. Field of the Invention

The present invention relates generally to isolation valves disposed in commercial and industrial fluid transport systems, and more particularly to an apparatus and method for simply and economically detecting leaky valve seals and defective fluid flow diverters without interrupting fluid transport system operations.

2. Background of the Invention

In many commercial and industrial fluid transport systems, isolation valves are employed as a defense against the development and escalation of hazardous operating conditions. As a result of their simple design, isolation valves are generally maintained in either an open or closed position for the majority of their operational lives; the particular operational position is primarily dependant upon the process environment in which the valves are employed. Unlike more sophisticated modulating control valves, which can be monitored and diagnosed for fluid leakage by periodically comparing the valve position and a fluid path flow rate, isolation valves have primarily been monitored and diagnosed in the past using one of the following previously known methods.

First, high frequency acoustical systems can be used to identify leaky valves under certain conditions. For example, valve leaks can be detected using high frequency acoustics when a monitored isolation valve is set in a closed position and a significant pressure gradient exists within the valve along the directional axis of the flow path. One or more pressure sensors are then used to "listen" for high frequency noise created by valve leakage.

One drawback to such a configuration is that, since the valve must first be completely closed in order to monitor or diagnose fluid leakage, the entire system must be taken off-line for monitoring and diagnosis activities. Moreover, since a significant pressure gradient must exist across the valve in order for a leak to be detected by the sensors, minor leaks may go undetected for a period and only later become apparent, perhaps after a significant escalation of a hazardous process condition has already occurred, or even after the valve seals have completely failed. Also, since valves in which only one of several seals has failed will not generally exhibit a significant pressure gradient along the flow path, partially leaky valves can also go undetected for some time. Finally, such tests can fail to detect whether the valve's fluid flow diversion means is functioning properly, since most valves are permanently disposed in only a single operational position during operations (i.e., either open or closed). In cases where the test is carried out on a valve that is operated in a continuously closed position, there is no way to discern whether the fluid diverter could in fact be opened during an emergency situation.

As seen in U.S. Pat. No. 6,128,946 to Leon et al., detection of leaky valve seals may also be accomplished using a system in which a series of pulsations caused by fluid vibrations within the transport system are compared to pulsations occurring within a valve's inner cavity as a function of time. Such configurations require at least two pressure sensors, one located within the system's flow path either upstream or downstream relative to the valve, and another disposed within the valve's inner cavity. The pulsations measured by the sensors can then be used to determine whether the pulsations detected within the transport system are being passed into the valve's inner cavity, thereby revealing the presence of leaky seals within the valve.

However, since the system of Leon et al. also requires, at minimum, a plurality of transducers, an analyzer to perform pulsation comparisons, and an appropriate transport system process connection disposed relatively close to the valve in order to function effectively, those of ordinary skill in the art have found the configuration to be unnecessarily cumbersome and expensive, and of limited application in transport systems having a complex geometry.

Finally, leaky valves may be detected when applying an external pressure source directly to the isolation valve's inner cavity by measuring the rate at which fluid leaks into the valve, and then comparing the results to a table of predetermined parameters and assessing the integrity of the seals. Those of skill in the art have also found this approach dissatisfactory, however, because the fluid transport system must first be taken off-line to perform testing and maintenance (since internal process pressures on the valve must be interrupted to determine whether the seals are allowing fluid to leak back into the valve), and both an external source of pressure and additional operational personnel are required.

In view of the foregoing, it is apparent there is a widespread need for a method and apparatus for simply and economically detecting leaky valve seals and defective flow diverters while an associated fluid transport system continues to operate on-line.

SUMMARY OF THE INVENTION

One aspect of the present invention comprises an apparatus for on-line detection of leaky valve seals comprising: an isolation valve, wherein said isolation valve comprises at least one upstream seal, at least one downstream seal, a fluid flow diverter, and an inner cavity isolated from a fluid flow path by the seals; a vent port disposed in fluid communication with said inner cavity; a vent valve disposed in fluid communication with said vent port; and a differential pressure sensor disposed in fluid communication with both the vent port and the fluid flow path.

Another aspect of the invention comprises a method of on-line detection of leaky valve seals comprising: disposing at least one upstream seal, at least one downstream seal, a fluid flow path, and a fluid flow diverter in mutual fluid communication; isolating an inner cavity from said fluid flow path by the seals; disposing a vent port in fluid communication with said inner cavity; disposing a vent valve in fluid communication with said vent port; and disposing a differential pressure sensor in fluid communication with both the vent port and the fluid flow path. According to a further aspect of the invention, the claimed method for online detection of leaky valve further comprises detection of a defective fluid flow diverter.

DETAILED DESCRIPTION

Figure 1:
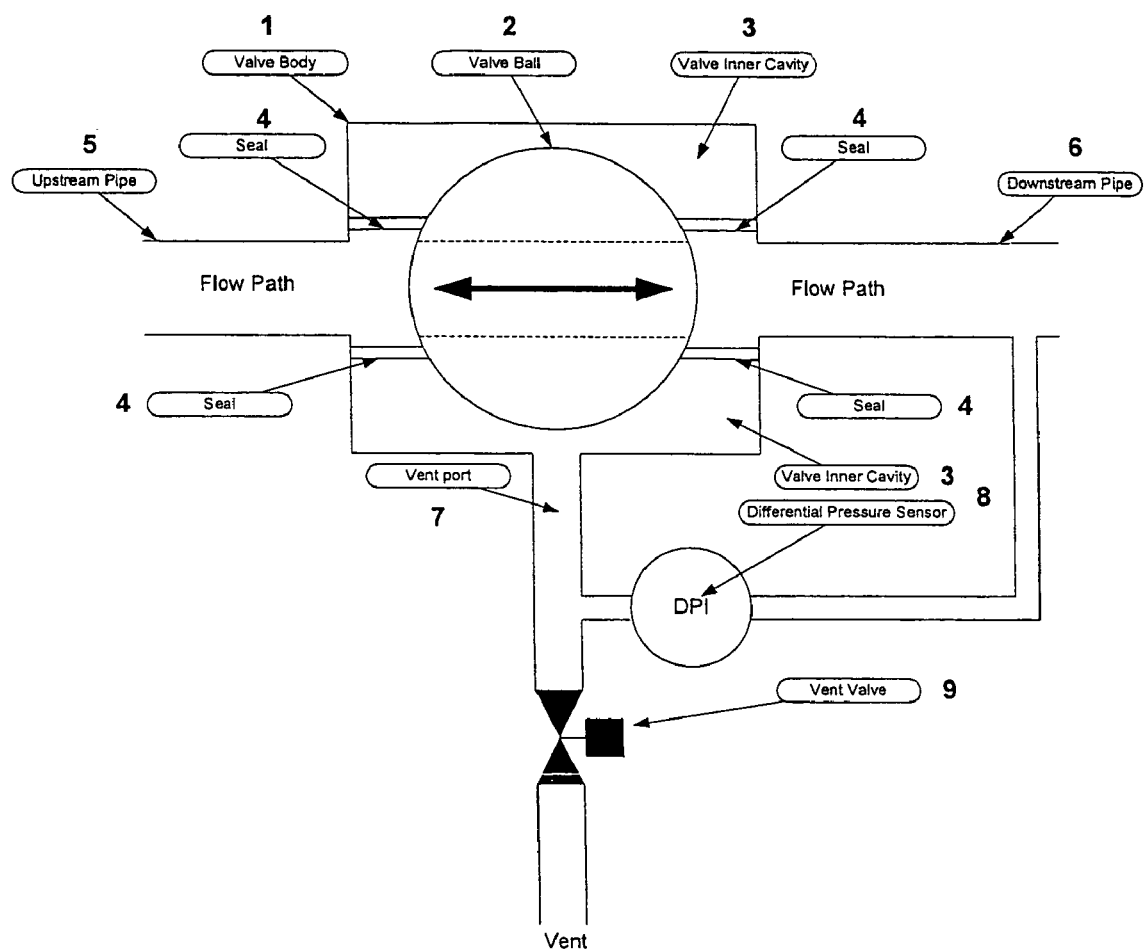
FIG. 1 depicts an embodiment of the invention wherein an open isolation valve is disposed in fluid communication with a fluid flow path.

Referring now to FIG. 1, an isolation valve according to one aspect of the present invention is provided, wherein the isolation valve comprises a valve body 1, a fluid flow diverter 2, an inner cavity 3, a plurality of valve seals 4, and a vent port 7. When the isolation valve is employed in a commercial or industrial fluid transport system having an upstream pipe 5 and a downstream pipe 6, process pressure is directed from the upstream pipe 5 to the downstream pipe 6 across flow diverter 2 in a manner such that the directional axis of the flow path remains substantially parallel to the directional axes of upstream pipe 5 and downstream pipe 6 throughout the fluid transport process. Those of skill in the pertinent arts will appreciate that while fluid flow diverter 2 is depicted herein as a trunnion-type valve ball, flow diverter 2 may also comprise an expansion gate-type valve or any other appropriate flow diversion means that would admit to practice of the present invention.

In some embodiments, vent port 7 is mechanically attached to valve body 1, though in other embodiments vent port 7 is formed structurally integral with valve body 1. In other embodiments, both the fluid flow path and vent port 7 remain in fluid communication with a differential pressure sensor 8, so that a difference in process pressure between the flow path and the vent port can be measured by means of the differential pressure sensor. In further embodiments, differential pressure sensor 8 measures a difference in fluid pressure in inner cavity 3 instead of vent port 7, and senses a difference in pressure between inner cavity 3 and the fluid flow path.

According to a further aspect of the invention, vent port 7 terminates with a vent valve 9. In certain embodiments, vent valve 9 is mechanically attached to vent port 7 using an attachment member designed to ensure that vent valve 9 is disposed in a leak-proof fit about a terminus point of vent port 7; in other embodiments, however, vent valve 9 is formed structurally integral with vent port 7. In a preferred embodiment, vent valve 9 is capable of being maintained in either an opened or closed position. Vent valve 9 is also in fluid communication with an exit vent, so that process pressure accumulated in inner cavity 3 can be vented to an external environment by passing the fluid through vent port 7, vent valve 9 and the exit vent.

Figure 2:
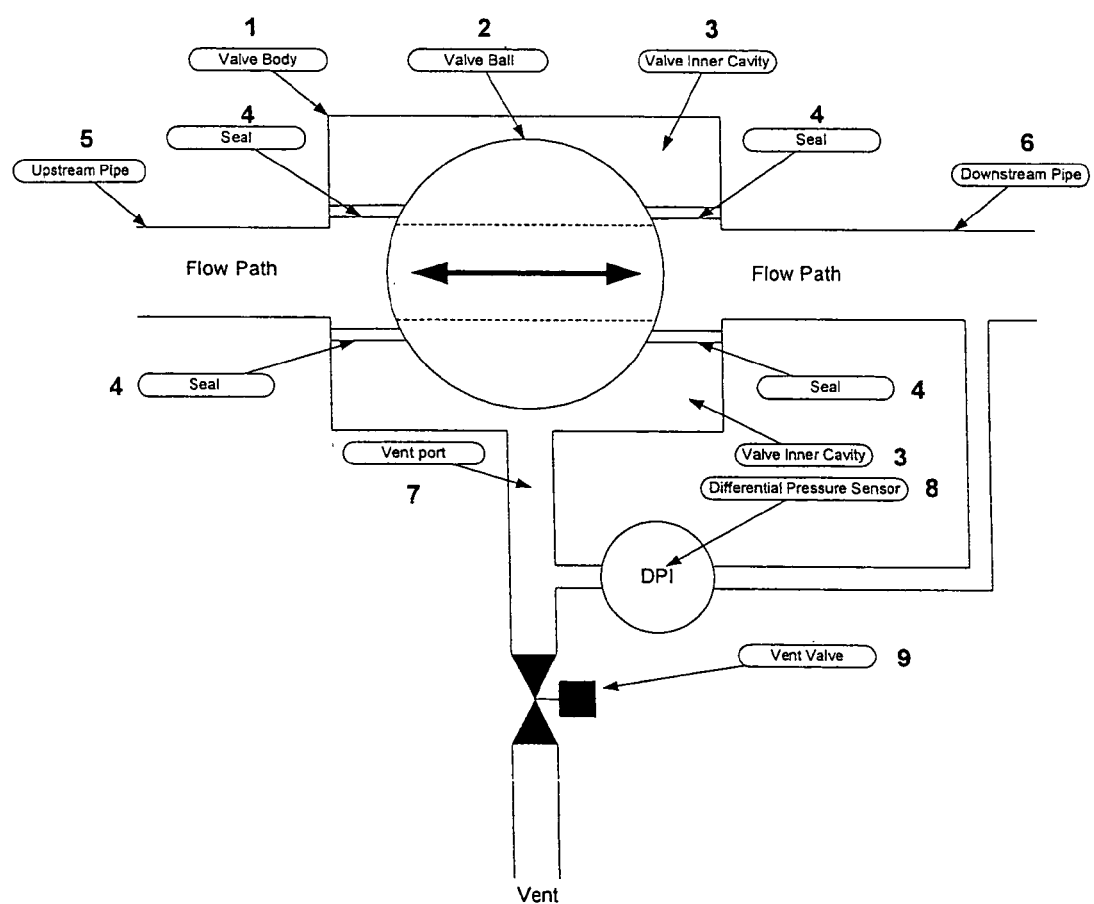
FIG. 2 depicts an embodiment of the invention wherein the isolation valve is partially closed so as to divert process pressure into the isolation valve's inner cavity, while a vent valve is maintained in a closed position so as to permit accumulation of the process pressure within the confines of the cavity; this aspect of the invention also tests whether the valve's flow diverter is functioning properly.

In FIG. 2, the isolation valve has been partially closed by rotating flow diverter 2 in such a manner that process pressure is diverted into the valve's inner cavity 3. In order to effectively permit accumulation of process pressure within the valve's inner cavity while the fluid transport system remains on-line, the angular rotational sweep of flow diverter 2 should be sufficiently large enough to permit process pressure to bypass the plurality of valve seals 4, but small enough that the directional axis of the fluid flow path through flow diverter 2 remains substantially parallel to the directional axis of the fluid transport system (for example, by rotating the valve ball about 30 degrees or less). If the fluid flow diverter is rotated too far, it becomes difficult to effectively test the valve while the transport system remains on-line, because the flow rate of the system is likely to be significantly interrupted as a result of the roiling currents created within the fluid flow path, and because the space through which fluid passes through the valve is greatly diminished. Vent valve 9 remains closed as process pressure is allowed to accumulate within the valve's inner cavity 3, and no process pressure is vented to the external environment during this stage of the valve's operation. In some embodiments, a pressure sensor in electrical communication with said differential pressure sensor 8 senses the rate at which pressure is accumulating within either inner cavity 3 or vent port 7, so that proper operation of flow diverter 2 is confirmed.

Figure 3:
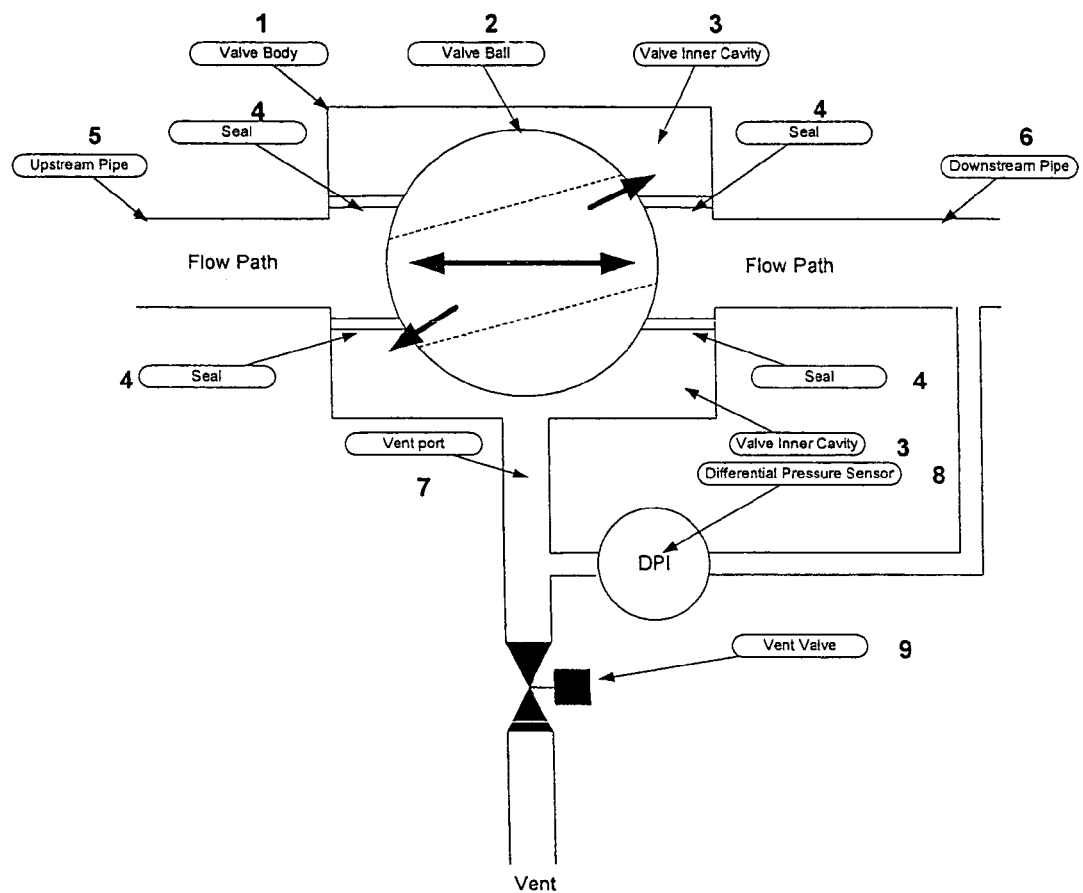
FIG. 3 depicts an embodiment of the invention wherein the isolation valve is returned to a fully opened position so as to again isolate the inner cavity from process pressure; the vent valve is then opened to permit venting of accumulated process pressure to an external environment by means of a vent port.

As seen in FIG. 3, flow diverter 2 is then rotated back to its original position, so that inner cavity 3 is again isolated from process pressure by the plurality of seals 4. Those of ordinary skill in the art will appreciate that the plurality of seals 4 may be formed from a variety of materials, for example, hard rubber, plastic, composite material, metal, etc., the only technical requirement being that the seals are capable of substantially isolating the valve's inner cavity 3 from process pressure when flow diverter 2 is disposed in an opened operating position. In further embodiments, vent valve 9 is then opened so that process pressure accumulated within the valve's inner cavity 3 is quickly vented to an external environment through the exit vent.

Figure 4:
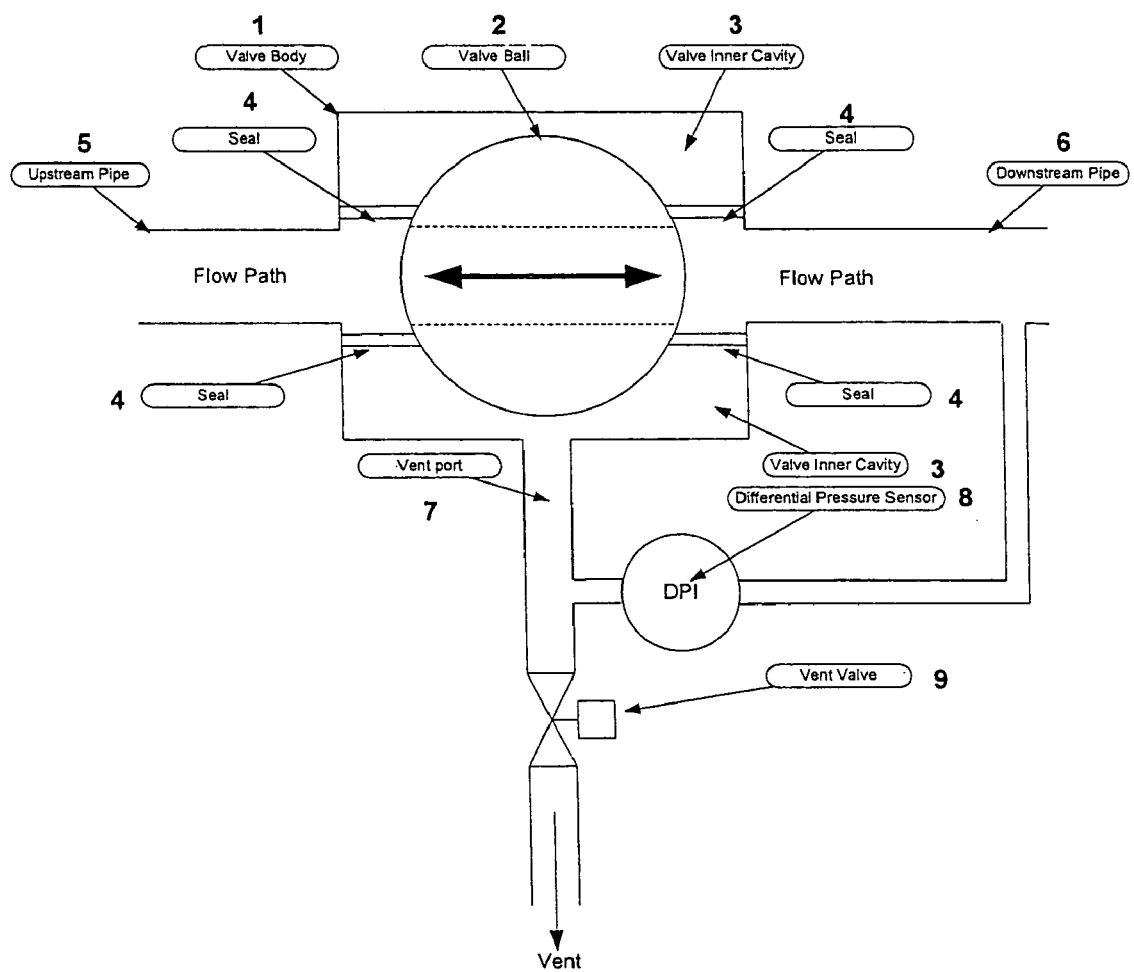
FIG. 4 depicts an embodiment of the invention wherein the isolation valve is fully opened while the vent valve is again closed, so that a differential pressure sensor disposed in fluid communication with both the process stream and the vent port senses the difference in pressure between the fluid in the process steam and fluid in the vent port.

Finally, as seen in FIG. 4, vent valve 9 is again closed while flow diverter 2 remains open, so that continuous on-line operation of the transport system is achieved. At this point, fluid pressure within inner cavity 3 and vent port 7 is approximately equal to the ambient pressure of the external environment. The near equilibrium of pressure within either inner cavity 3 or vent port 7 can be confirmed by means of a pressure sensor disposed in electrical communication with differential pressure sensor 8. To the extent that differential pressure sensor 8 indicates that fluid pressure within either inner cavity 3 or vent port 7 is approaching the fluid pressure of the flow path, an observer (or data processor) can conclude that one or more of the plurality of seals 4 is leaking. Since in practice no isolation valve can ever be completely leak proof, each valve is assigned a predetermined acceptable leak rate. If differential pressure sensor 8 indicates that fluid pressure within vent port 7 and the fluid pressure within the flow path are converging toward similar values faster than would be expected given a particular valve's predetermined acceptable leak rate, the observer (or data processor) can conclude that the integrity of the seals has diminished to the point that they no longer effectively seal the valve. At this point, either the seals or the entire valve must be replaced.

The foregoing specification is provided for illustrative purposes only, and is not intended to describe all possible aspects of the present invention. Moreover, while the invention has been shown and described in detail with respect to several exemplary embodiments, those of ordinary skill in the pertinent arts will appreciate that minor changes to the description, and various other modifications, omissions and additions may also be made without departing from either the spirit or scope thereof.

The invention claimed is:

1. An apparatus for on-line detection of leaky valve seals, said apparatus comprising:
   an isolation valve, wherein said isolation valve comprises at least one upstream seal, at least one downstream seal, a fluid flow diverter, and an inner cavity isolated from a fluid flow path by said at least one upstream seal and said at least one downstream seal;
   a vent port disposed in fluid communication with said inner cavity;
   a vent valve disposed in fluid communication with said vent port; and
   a differential pressure sensor disposed in fluid communication with each of said vent port and said fluid flow path;
   wherein said fluid flow diverter is used to divert at least some of said fluid flow into said inner cavity when said fluid flow diverter is at least partially opened, and to isolate fluid flow accumulated in said inner cavity when said fluid flow diverter is again closed, thereby allowing said fluid flow to accumulate in said inner cavity and said vent port;
   wherein said vent valve is used to evacuate fluid flow accumulated in said inner cavity and said vent port when said vent valve is opened, and again isolate fluid flow accumulating in said inner cavity when said vent valve is closed; and
   wherein said differential pressure sensor is used to determine whether either of said upstream seal and said downstream seal are leaking by measuring a difference between the pressure of fluid flow re-accumulating in said vent port and the pressure of fluid flow that has already passed said downstream seal and entered a downstream flow path.

2. The apparatus of claim 1, wherein said fluid flow diverter further comprises:
   a means for diverting fluid from said fluid flow path into said inner cavity when said fluid flow diverter is disposed in a partially closed position; and
   a means for effectively isolating said inner cavity from said fluid flow path when said fluid flow diverter is disposed in a fully opened position.

3. The apparatus of claim 2, wherein said fluid flow diverter further comprises a ball rotatably disposed within said isolation valve.

4. The apparatus of claim 3, wherein said ball further comprises a trunnion-type valve ball.

5. The apparatus of claim 2, wherein said fluid flow diverter is disposed so as to permit fluid from said fluid flow path to be diverted into said inner cavity when said fluid flow diverter is rotated to a rotational angle of less than about 30°.

6. The apparatus of claim 1, wherein said at least one upstream seal and said at least one downstream seal are disposed so that fluid from said fluid flow path is prevented from entering said inner cavity when said fluid flow diverter is disposed in a fully opened position.

7. The apparatus of claim 1, wherein said vent port is formed structurally integral with said isolation valve.

8. The apparatus of claim 1, wherein said vent port is mechanically attached to said isolation valve.

9. The apparatus of claim 1, wherein said vent valve is formed structurally integral with said vent port.

10. The apparatus of claim 1, wherein said vent valve is mechanically joined with said vent port.

11. The apparatus of claim 1, wherein said differential pressure sensor further comprises a pressure sensor in fluid communication with said vent port.

12. The apparatus of claim 1, wherein said differential pressure sensor further comprises a pressure sensor in fluid communication with said inner cavity.

13. The apparatus of claim 1, wherein said differential pressure sensor further comprises a pressure sensor in fluid communication with said flow path.

14. The apparatus of claim 1, wherein said differential pressure sensor further comprises an analog differential pressure sensor.

15. The apparatus of claim 1, wherein said differential pressure sensor further comprises a digital differential pressure sensor.

16. A method of on-line detection of leaky valve seals, said method comprising:
   disposing at least one upstream seal, at least one downstream seal, a fluid flow path, and a fluid flow diverter in mutual fluid communication;
   isolating an inner cavity from said fluid flow path by means of said at least one upstream seal and said at least one downstream seal;
   disposing a vent port in fluid communication with said inner cavity;
   disposing a vent valve in fluid communication with said vent port;
   disposing a differential pressure sensor in fluid communication with each of said vent port and said fluid flow path;
   diverting at least some fluid flow into said inner cavity by at least partially opening said fluid flow diverter, thereby allowing said fluid flow to accumulate in said inner cavity and said vent port;
   isolating accumulated fluid flow in said inner cavity by closing said fluid flow diverter;
   opening said vent valve so that accumulated fluid flow is evacuated from said inner cavity and said vent port, and then closing said vent valve; and
   using said differential pressure sensor to determine whether either of said upstream seal and said downstream seal are leaking by measuring a difference between the pressure of any fluid flow re-accumulating in said vent port and the pressure of fluid flow that has already passed said downstream seal and entered a downstream flow path.

17. The method of claim 16, wherein said disposing a fluid flow diverter further comprises:
   disposing a means for diverting fluid from said fluid flow path into said inner cavity when said fluid flow diverter is disposed in a partially closed position; and
   disposing a means for effectively isolating said inner cavity from said fluid flow path when said fluid flow diverter is disposed in a fully opened position.

18. The method of claim 17, wherein said disposing a fluid flow diverter further comprises disposing a rotatable ball.

19. The method of claim 18, wherein said disposing a rotatable ball further comprises disposing a trunnion-type valve ball.

20. The method of claim 17, wherein said disposing a fluid flow diverter further comprises disposing a fluid flow diverter so as to permit fluid from said fluid flow path to be diverted into said inner cavity when said fluid flow diverter is rotated to a rotational angle of less than about 30°.

21. The method of claim 16, wherein said disposing at least one upstream seal and said disposing at least one downstream seal further comprises disposing at least one upstream seal and at least one downstream seal so that fluid from said fluid flow path is prevented from entering said inner cavity when said fluid flow diverter is disposed in a fully opened position.

22. The method of claim 16, wherein said disposing a vent port further comprises disposing a vent port formed structurally integral with said isolation valve.

23. The method of claim 16, wherein said disposing a vent port further comprises disposing vent port that is mechanically attached to said isolation valve.

24. The method of claim 16, wherein said disposing a vent valve further comprises disposing a vent valve formed structurally integral with said vent port.

25. The method of claim 16, wherein said disposing a vent valve further comprises disposing a vent valve that is mechanically joined with said vent port.

26. The method of claim 16, wherein said disposing a differential pressure sensor further comprises disposing a pressure sensor in fluid communication with said vent port.

27. The method of claim 16, wherein said disposing a differential pressure sensor further comprises disposing a pressure sensor in fluid communication with said inner cavity.

28. The method of claim 16, wherein said disposing a differential pressure sensor further comprises disposing a pressure sensor in fluid communication with said flow path.

29. The method of claim 16, wherein said disposing a differential pressure sensor further comprises disposing an analog differential pressure sensor.

30. The method of claim 16, wherein said disposing a differential pressure sensor further comprises disposing a digital differential pressure sensor.

31. The method of claim 16, wherein said on-line detection of leaky valves further comprises detection of a defective fluid flow diverter.

* * * * *